United States Patent
Aoki et al.

(10) Patent No.: US 9,317,236 B2
(45) Date of Patent: Apr. 19, 2016

(54) INFORMATION PROCESSING APPARATUS, INFORMATION PROCESSING METHOD AND RECORDING MEDIUM

(71) Applicants: Yosuke Aoki, Kanagawa (JP); Yoshinori Sochi, Tokyo (JP)

(72) Inventors: Yosuke Aoki, Kanagawa (JP); Yoshinori Sochi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/642,603

(22) Filed: Mar. 9, 2015

(65) Prior Publication Data

US 2015/0261489 A1    Sep. 17, 2015

(30) Foreign Application Priority Data

Mar. 11, 2014 (JP) .................................. 2014-047897
Feb. 25, 2015 (JP) .................................. 2015-035473

(51) Int. Cl.
*G06F 3/12* (2006.01)

(52) U.S. Cl.
CPC ............ *G06F 3/1275* (2013.01); *G06F 3/1205* (2013.01); *G06F 3/1206* (2013.01); *G06F 3/1282* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 2009/0279125 A1* | 11/2009 | Liu | ...................... | G06F 3/1205 358/1.15 |
| 2012/0070216 A1* | 3/2012 | Sochi | ................. | G03G 15/5087 400/76 |
| 2012/0287463 A1 | 11/2012 | Iida | | |

FOREIGN PATENT DOCUMENTS

| | | |
|---|---|---|
| JP | 2009-271930 | 11/2009 |
| JP | 2012-238188 | 12/2012 |
| JP | 2013-088992 | 5/2013 |

* cited by examiner

*Primary Examiner* — Ngon Nguyen
(74) *Attorney, Agent, or Firm* — Duft Bornsen & Fettig LLP

(57) ABSTRACT

An information processing apparatus for creating drawing data based on a printing job including printing data and setting information, includes a drawing data creating unit configured to create drawing data based on the printing job; and a control data creating unit configured to create first control data and second control data, based on the printing data and the setting information, for controlling the drawing data creating unit to create the drawing data, in response to detecting that a predetermined setting is included in the setting information. The control data creating unit outputs the first control data to the drawing data creating unit to create first drawing data, and outputs the second control data to the drawing data creating unit to create second drawing data in which the first drawing data is used.

8 Claims, 19 Drawing Sheets

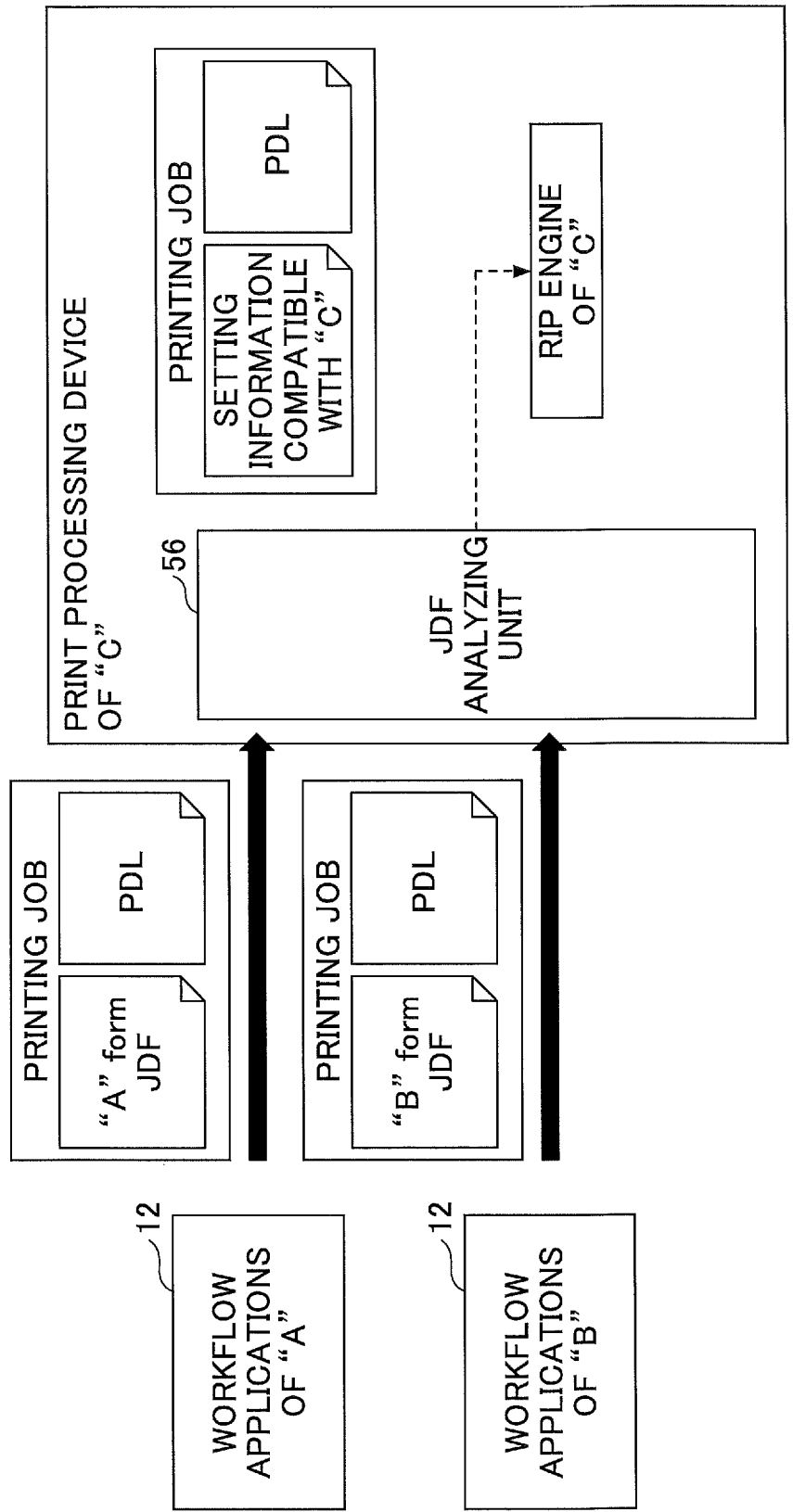

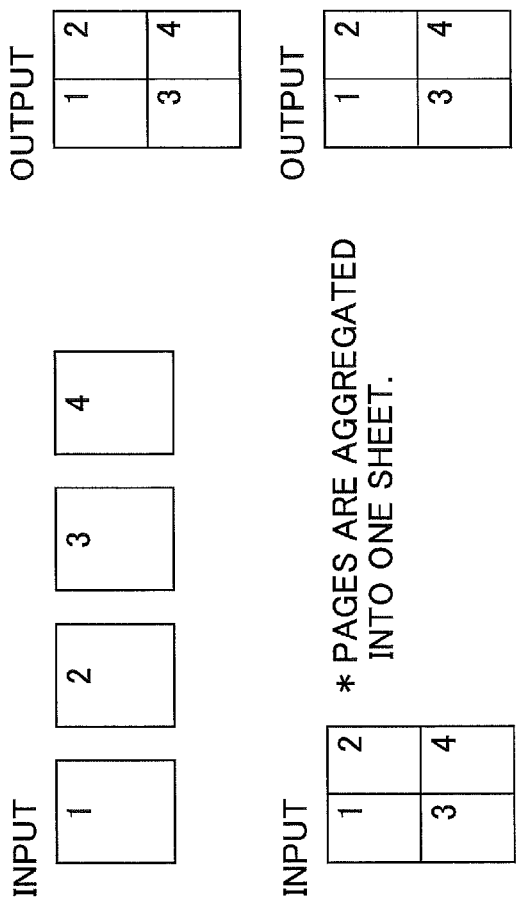

4up + STAMP
■ DESIRED OUTPUT RESULT

■ "A" <u>Page Mode</u>
   JDF : 4up
   PDL : 4 PAGES

\* UNABLE TO PERFORM WORK ON THE SHEET SURFACE

■ "B" <u>Sheet Mode</u>
   JDF : 4up
   PDL : 1 PAGE

\* ABLE TO PERFORM WORK ON THE SHEET SURFACE

```
<JDFxmlns="http://www.CIP4.org/JDFSchema_1_1" xmlns:C="www.ccc.com/schema/ccc" ...>
    ...
    <ResourceLinkPool>
    <ComponentLink ... Amount = "2" ... />
    ...
    </ResourceLinkPool>
    <ResourcePool>
    <LayoutPreparationParams ... Rotate = "Rotate90" ... >
    ...
    </LayoutPreparationParams>
    ...
    </ResourcePool>
</JDF>
```

FIG.8A

```
<JDFxmlns="http://www.CIP4.org/JDFSchema_1_1" xmlns:A="www.aaa.com/schema/aaa" ...>
    ...
    <ResourceLinkPool>
    <ComponentLink ... Amount = "2" ... />
    ...
    </ResourceLinkPool>
    <ResourcePool>
    <LayoutPreparationParams ... A:Rotate = "2" ... >
    ...
    </LayoutPreparationParams>
    ...
    </ResourcePool>
</JDF>
```

FIG.8B

```
<JDFxmlns="http://www.CIP4.org/JDFSchema_1_1" xmlns:B="www.bbb.com/schema/bbb" ...>
  ...
  <ResourceLinkPool>
    <ComponentLink ... B:DeliveryAmount = "2" ... />
  </ResourceLinkPool>
  <ResourcePool>
    <LayoutPreparationParams ...  B:AlternateRotation ="false"  ....  B:Rotate = "1" >
    </LayoutPreparationParams>
    ...
  </ResourcePool>
</JDF>
```

■ OUTPUT RESULT

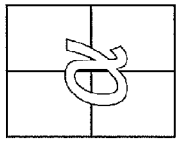

FIG.9B

```
<JDF xmlns=http://www.CIP4.org/JDFSchema_1_1"
xmlns:C="www.ccc.com/schema/ccc" ...>

<ResourceLinkPool>
...
<LayoutPreparationParamsLink CombinedProcessIndex="0" Usage="Input"
rRef="LPP0"/>
<LayoutLink CombinedProcessIndex="4" Usage="Input" rRef="L0"/>
</ResourceLinkPool>

<ResourcePool>
...
<LayoutPreparationParams ... ID="LPP0" NumpberUp="2 2" ...>
<PageCell Rotate="Rotate0">
...
</PageCell>
</LayoutPreparationParams>

<Layout Class="Parameter" ID="L0" Status="Available">
<MarkObject CTM = "1 0 0 1 10 10">
<LayoutElement Class = "Parameter" ElementType = "Image">
<FileSpec URL = "File://Image.bmp"/>
<LayoutElement>
</MarkObject>
```

FIG.9C

■ OUTPUT RESULT

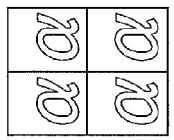

FIG.9D

```
<JDF xmlns=http://www.CIP4.org/JDFSchema_1_1"
xmlns:C="www.ccc.com/schema/ccc" ...>
  <ResourceLinkPool>
  ...
  <LayoutPreparationParamsLink CombinedProcessIndex="0" Usage="Input" rRef="LPP0"/>
  ...
  </ResourceLinkPool>
  <ResourcePool>
    <LayoutPreparationParams ... ID="LPP0" NumberUp="2 2" ... >
      <PageCell Rotate="Rotate0">
      ...
      <Layout Class="Parameter" ID="L0" Status="Available">
        <MarkObject CTM = "1 0 0 1 10 10">
          <LayoutElement Class = "Parameter" ElementType = "Image">
            < FileSpec URL = "File://Image.bmp"/>
          </LayoutElement>
        </MarkObject>
      </Layout>
      ...
      </PageCell>
    </LayoutPreparationParams>
```

FIG.10A

| "C" JDF | | Job Attribute in DFE | |
|---|---|---|---|
| NAME OF ATTRIBUTE | VALUE | NAME OF ITEM | VALUE |
| Amount | | Number of Print Copies | |
| | 1~32767 | | 1~32767 |
| Rotate | | Rotation | |
| | Rotate0 | | 0° |
| | Rotate90 | | 90° |
| | Rotate180 | | 180° |
| | Rotate270 | | 270° |
| ... | | ... | |
| | ... | | ... |
| | ... | | ... |

FIG.10B

| "A" JDF | | Job Attribute in DFE | |
|---|---|---|---|
| NAME OF ATTRIBUTE | VALUE | NAME OF ITEM | VALUE |
| A:Amount | | Number of Print Copies | |
| | 1~32767 | | 1~32767 |
| A:Rotate | | Rotation | |
| | 1 | | 0° |
| | 2 | | 90° |
| | 3 | | 180° |
| | 4 | | 270° |
| ... | | ... | |
| | ... | | ... |
| | ... | | ... |

FIG.10C

| "B" JDF | | Job Attribute in DFE | |
|---|---|---|---|
| NAME OF ATTRIBUTE | VALUE | NAME OF ITEM | VALUE |
| B:DeliveryAmount | | Number of Print Copies | |
| | 1~32767 | | 1~32767 |
| B:AlternateRotation | | Rotation | |
| | true | | |
| | false | | |
| B:Rotate | | | |
| | 1 | | 0° |
| | 2 | | 90° |
| | 3 | | 180° |
| | 4 | | 270° |
| ... | | ... | |
| | ... | | ... |
| | ... | | ... |

FIG.12

| ITEM | | |
|---|---|---|
| Job Information | Number of Print Copies | |
| | Number of Print Copies | |
| | RIP Control Mode | |
| | Job Attribute in DFE Related Information | |
| | RIP Engine Identification Information | |
| Edit Information | Direction Information | |
| | Print Side Information | |
| | Rotation | |
| | Expansion/Reduction | |
| | Position of Image | Offset |
| | | Position Adjusting Information |
| | Layout Information | Custom・Imposition |
| | | number of pages |
| | | Imposition Information |
| | | Page Oder Information |
| | | Creep position Adjustment |
| | Margin Information | |
| | Mark Information | Center・Crop・Mark Information |
| | | Corner・Crop・Mark Information |
| | | Sheet Attribute |
| Finishing Information | Collate Information | |
| | Staple/Bind Information | |
| | Punch Information | |
| | Folding Information | |
| | Trim Information | |
| | Output Tray Information | |
| | Input Tray Information | |
| | Cover・Sheet Information | |

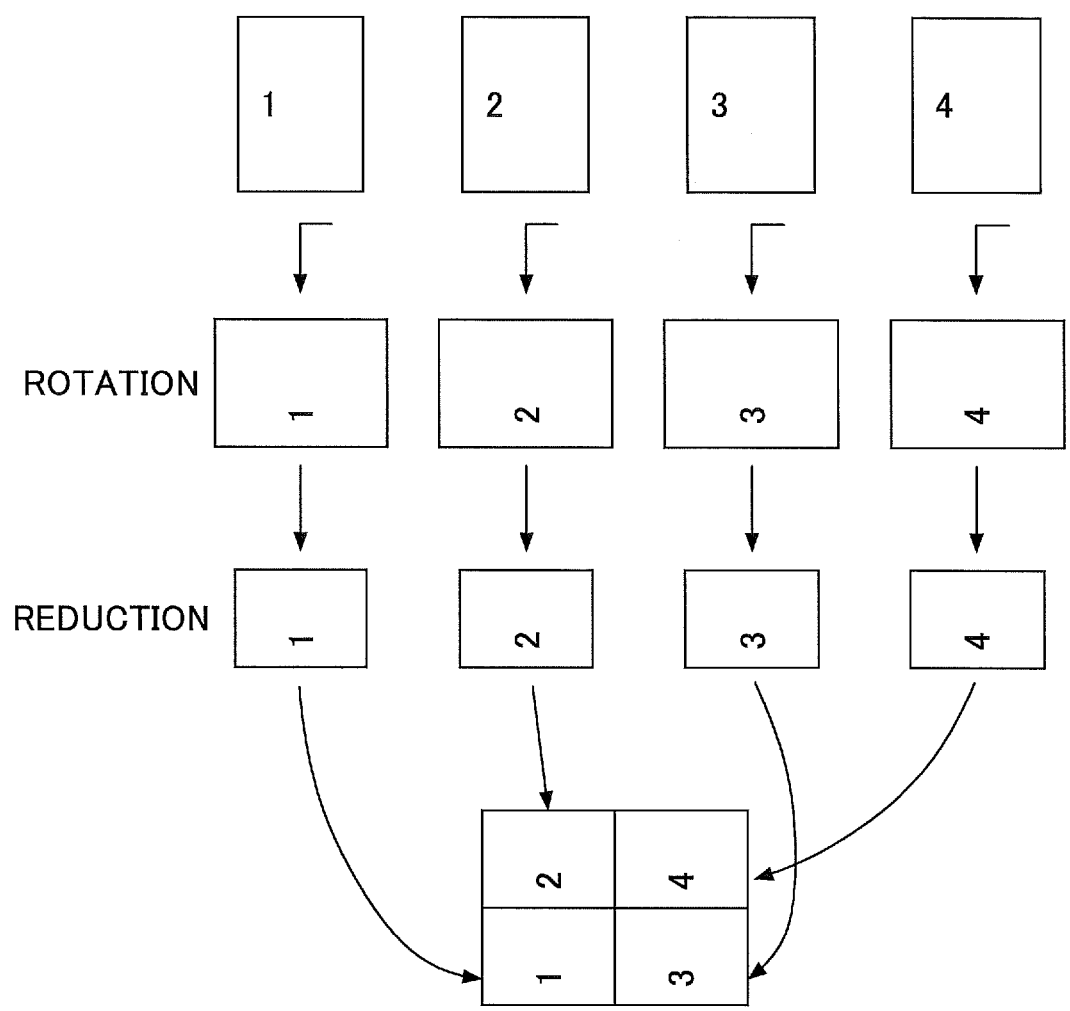

FIG.14

| ITEM | | |
|---|---|---|
| Input/Output Data Type Information | | |
| Input/Output Data Read/Write position designation Information | | |
| Input/Output Data Read/Write position Information | | |
| Input/Output Data Read/Write Execution Mode | | |
| Measurement Unit Information (Dimension) | | |
| Input/Output Data Compression Method Information | | |
| RIP Control Mode | | |
| RIP Engine Identification Information | | |
| Input/Output Image Information Part | Information Related to Output Image | Image Format·Type |
| | | Image Format·Dimension |
| | | Image Format·Resolution |
| | | Position of Image |
| | | Color Separation Information |
| | | Color Plane·Fit·Policy Information |
| | | Plane Shift Information |
| | | Number of Bits in Image Format |
| | | Image Direction Information |
| | | Image Formation Position Information |
| | | Image Formation Size Information |
| | | Image Formation Method Information |
| | | Color ICC Information |
| | | Font Replacement Information |
| | | Image Formation Basic Point Information |
| | | Flat K Black Information |
| | | Rendering Information |
| | Information Related to Input Image | Image Format·Type |
| | | Image Format·Dimension |
| | | Image Format·Resolution |
| | | Position of Image |
| | | Input Data |
| | | Page Range Information |
| | | Color ICC Information |
| | Information Related to Operation of Image | Scaling·Offset Information |
| | | Object·Area Information |
| | | Halftone Information |
| | | Scaling·Algorithm Information |
| Information Related to PDL | Data Area | |
| | Size Information | |
| | Data Arrangement Method | |

INFORMATION PROCESSING APPARATUS, INFORMATION PROCESSING METHOD AND RECORDING MEDIUM

BACKGROUND OF THE INVENTION

1. Field of the Invention

The present technology relates to an information processing apparatus creating drawing data based on a printing job which includes printing data and setting information, and the like.

2. Description of the Related Art

So called production printing that is of printing service, in which a lot of documents for business use are printed or bound, is known (for example, Japanese Laid-open Patent Publication No. 2012-238188). In the Japanese Laid-open Patent Publication No. 2012-238188, a printing system for informing a user whether a post process is available or not, in view of the whole system, is disclosed.

In the production printing, a printing process is usually handled as a workflow, and opening a printing workflow is proceeded with. By opening the printing workflow, it is possible to describe setting files, or the like for printing jobs in important printing processes, etc., by common format, in software (workflow applications, described below), or printers of different manufacturers. A standard format referred to as a JDF (Job Definition Format) is known, as a format for describing all the processes of the printing workflow.

There are various processes in the printing workflow, such as a process for creating documents or contents, processes for designating printing methods, printing processes, post processes, or the like. Although these processes are performed by various workflow applications or printers, cooperation or printing process management can be achieved between printers by the JDF.

However, some workflow applications or printing devices may extend the format of the JDF. In this case, the JDF provided by the workflow applications of the different manufacturers may include a description in proprietary format. In this case, it is known that the workflow applications or the printing devices located downstream may not analyze the JDF to process.

For solving such an inconvenience, it may be conceived that the workflow applications or the printing devices located downstream convert the JDF created by the workflow applications located upstream into one which is compatible with themselves.

However, even if the JDF created by the workflow applications located upstream is converted into one which is compatible with themselves, variances may be seen in the output result. That is, the JDF is sent with PDL (Page Description Language), as a printing job, from the workflow applications located upstream to the workflow applications or printers located downstream.

Here, even if a form of the printing job (JDF+PDL) is common among various manufacturers, the output result may differ due to variances of rendering engines of the printing devices of the manufacturers.

RELATED ART DOCUMENT

Patent Document

[Patent Document 1]: Japanese Laid-open Patent Publication No. 2012-238188

SUMMARY OF THE INVENTION

An object of disclosure of the present technology is to provide an information processing apparatus capable of reducing variances of output results due to variances of rendering engines of various manufacturers.

The following configuration is adopted to achieve the aforementioned object.

In one aspect of the embodiment, an information processing apparatus for creating drawing data based on a printing job including printing data and setting information, includes a drawing data creating unit configured to create drawing data based on the printing job; and a control data creating unit configured to create first control data and second control data, based on the printing data and the setting information, for controlling the drawing data creating unit to create the drawing data, in response to detecting that a predetermined setting is included in the setting information. The control data creating unit outputs the first control data to the drawing data creating unit to create first drawing data, and outputs the second control data to the drawing data creating unit to create second drawing data in which the first drawing data is used.

Other objects, features and advantages of the present invention will become more apparent from the following detailed description when read in conjunction with the accompanying drawings.

BRIEF DESCRIPTION OF THE DRAWINGS

FIG. 1A is an illustration diagram illustrating inconvenience in a case where extended JDF is used;

FIG. 2A is an illustration diagram illustrating a "RIP Control Mode";

FIG. 2B is another illustration diagram illustrating the "RIP Control Mode";

FIG. 8A is an illustration diagram illustrating an example of a part of description in the JDF;

FIG. 8B is another illustration diagram illustrating an example of a part of description in the JDF;

FIG. 8C is another illustration diagram illustrating an example of a part of description in the JDF;

FIG. 9A is an example of output result according to a sheet attribute of stamp;

FIG. 9B is an example of JDF including the sheet attribute of stamp;

FIG. 9C is an example of output result according to a cell attribute of stamp;

FIG. 9D is an example of JDF including the cell attribute of stamp;

FIG. 10A is an illustration diagram illustrating an example of a conversion table of "C";

FIG. 10B is an illustration diagram illustrating an example of a conversion table of "A";

FIG. 10C is an illustration diagram illustrating an example of a conversion table of "B";

FIG. 12 is an illustration diagram illustrating an example of a "Job Attribute in DFE";

FIG. 13 is an illustration diagram illustrating difference between the "Job Attribute in DFE" for "Sheet" and the "Job Attribute in DFE" for "Page";

FIG. 14 is an illustration diagram illustrating an example of "RIP Parameter List";

DETAILED DESCRIPTION OF THE PREFERRED EMBODIMENTS

Herein below, embodiments will be described with reference to accompanying drawings.

[Schematic Explanation of Present Printing System]

Figure 1B:
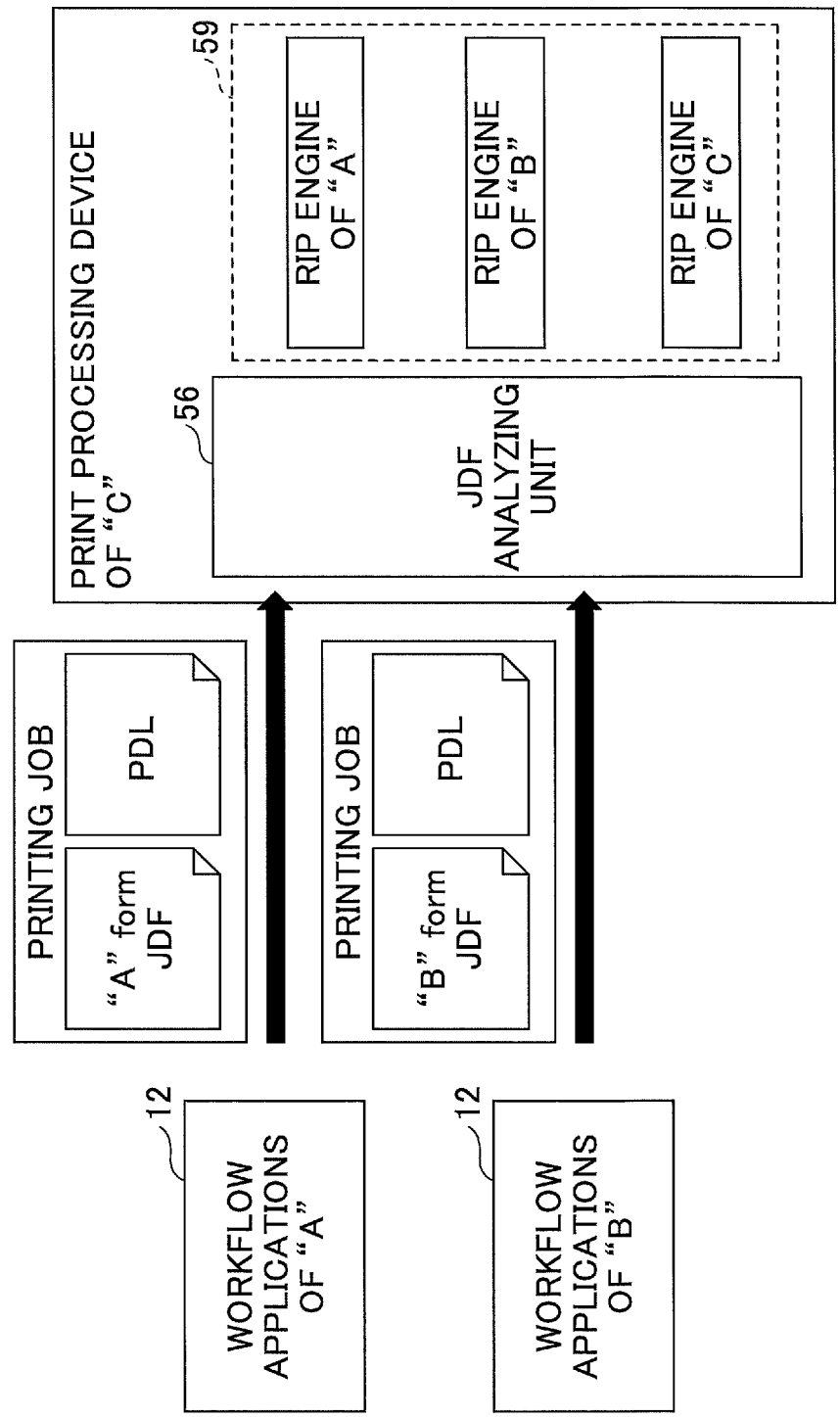
FIG. 1B is another illustration diagram illustrating inconvenience in a case where extended JDF is used.

FIG. 1A and FIG. 1B are illustration diagrams illustrating inconvenience in a case where extended JDF is used. Additionally, FIG. 1A and FIG. 1B show an example of comparison, not an example of prior art. In a case where the JDF is analyzed to be found unable to process due to the extension of the JDF, as shown in FIG. 1A, it may be considered that the workflow applications or the printing devices located downstream analyze the JDF to determine the manufacturer of an application which has created the JDF. For example, a print processing device of a manufacturer "C" analyzes, using a JDF analyzing unit 56, the JDF created by a workflow application of manufacturer "A" (or "B") in a format of manufacturer "A" (or "B") to determine a printing job as a printing job of "A" (or "B"). If the JDF is determined to be in the format of "A" (or "B"), the extended format is known. Therefore, the printing device converts the JDF of "A" (or "B") into setting information compatible with the print processing device of "C", thereby rendering the printing job.

However, not only the JDF but also PDL may be extended in some printing jobs. In this case, the print processing device of "C" may not absorb variances of PDL.

Also, there is a case where output results differ due to variances of the workflow applications or rendering engines in the printing devices.

Therefore, as shown in FIG. 1B, it is considered that the print processing device of "C" includes the rendering engines (hereinafter, referred to as RIP engine) corresponding to workflow applications of the respective manufacturers. Thus, the print processing device of "C" can perform rendering with the finished appearance desired by a user.

Also, in a case where a plurality of the RIP engines are included, the variances of the PDL can be absorbed by operating in appropriate control mode according to the RIP engine to be used. Specifically, in aggregation printing, some of the RIP engines are operated in "Page Mode", while some others are operated in "Sheet Mode". Such modes of operation are referred to "RIP Control Mode".

FIG. 2A is an illustration diagram illustrating the "RIP Control Mode". FIG. 2B is another illustration diagram illustrating the "RIP Control Mode". FIG. 2A shows control of the rendering in the "Page Mode", while FIG. 2B shows control of the rendering in the "Sheet Mode". The aggregation print of four pages (four pages Number up) will be described as an example. The PDL of the manufacturer "A" is created for the "Page Mode", where page images are described page by page. Therefore, the PDL includes the page images for four pages. Meanwhile, The PDL of the manufacturer "B" is created for the "Sheet Mode", where a page image, in which four pages to be aggregated have been imposed, is described. Therefore the PDL includes only a page image for one page. "Page Mode". In this mode, an instruction for RIP processing is given page by page, and the raster data, in which the pages are aggregated into one sheet, is created. "Sheet Mode". In this mode, plural pages are aggregated into one sheet in advance, and an instruction for RIP processing is given part by part (respectively referred to as a cell) of the sheet, thereby creating the raster data. The print processing device of "C" absorbs the difference of the "RIP Control Mode"s by controlling the RIP engine of "A" and the RIP engine of "B" according to the "RIP Control Mode" of the respective RIP engines.

However, performing work on an entire sheet surface may be prevented due to the difference of the "RIP Control Mode"s. Additionally, the sheet means a recording medium output as a printed object such as a paper.

Figure 3A:
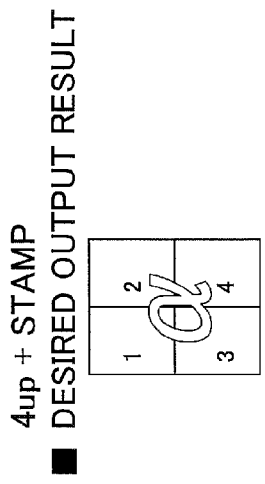
FIG. 3A is an illustration diagram for illustrating performing work on a sheet surface.
Figure 3B:
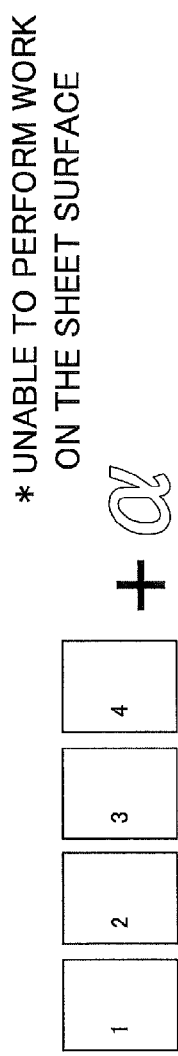
FIG. 3B is another illustration diagram for illustrating performing work on the sheet surface.
Figure 3C:
FIG. 3C is another illustration diagram for illustrating performing work on the sheet surface.

FIG. 3A is an illustration diagram for illustrating performing work on the sheet surface. FIG. 3B is another illustration diagram for illustrating performing work on the sheet surface. FIG. 3C is another illustration diagram for illustrating performing work on the sheet surface. As shown in FIG. 3A, the desired output result is to aggregate four pages into one sheet and to perform work to stamp "α" on the entire sheet surface.

The RIP engine of "A" is operated in the "Page Mode", while the RIP engine of "B" is operated in the "Sheet Mode". As shown in FIG. 3C, the RIP engine of "B" can perform work on the sheet surface since, as described above, the rendering is performed where plural pages have been aggregated, in the "Sheet Mode".

Meanwhile, as shown in FIG. 3B, since the RIP engine of "A" is operated in the "Page Mode" where the rendering is performed page by page, it is difficult to perform rendering with straddling pages on a sheet surface.

The present embodiment enables the RIP engine of "A" to perform work on the sheet surface by operating the RIP engine in series in the "Page Mode" and the "Sheet Mode".

Figure 4:
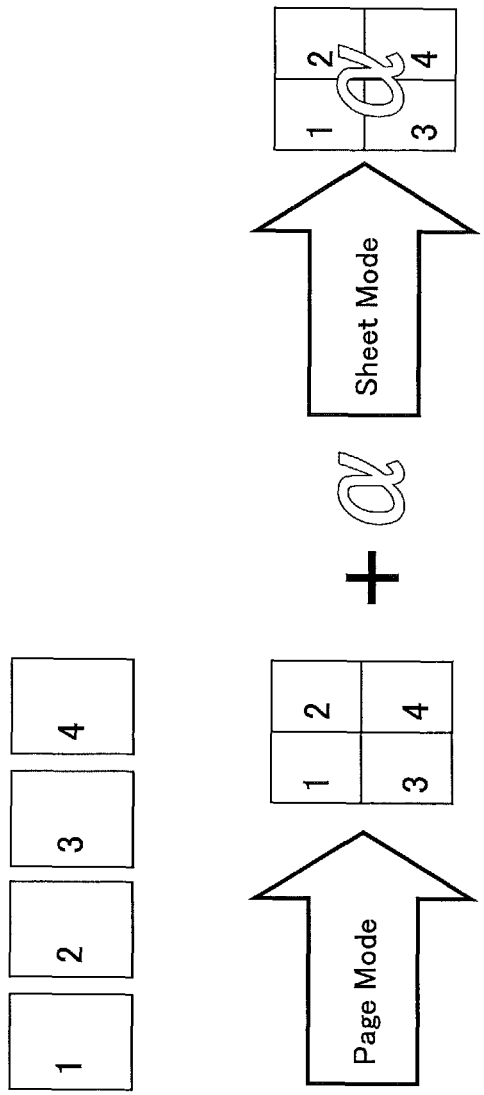
FIG. 4 is an illustration diagram showing a frame format of a process of work on the sheet surface in aggregation printing by a RIP engine of "A"

FIG. 4 is an illustration diagram showing a frame format of a process of work on the sheet surface in the aggregation printing by the RIP engine of "A".

1) The RIP engine of "A" performs rendering in the "Page Mode" from Page 1 to page 4, thereby outputting images of four pages as one image. At this time, a stamp is not added.

2) Then, the RIP engine of "A" adds the stamp on the image where the four pages are aggregated by performing rendering in the "Sheet Mode".

Thus, the RIP engine, which is expected to be operated in the "Page Mode", can perform work with straddling pages on a sheet surface.

[Example Configuration]

Figure 5:
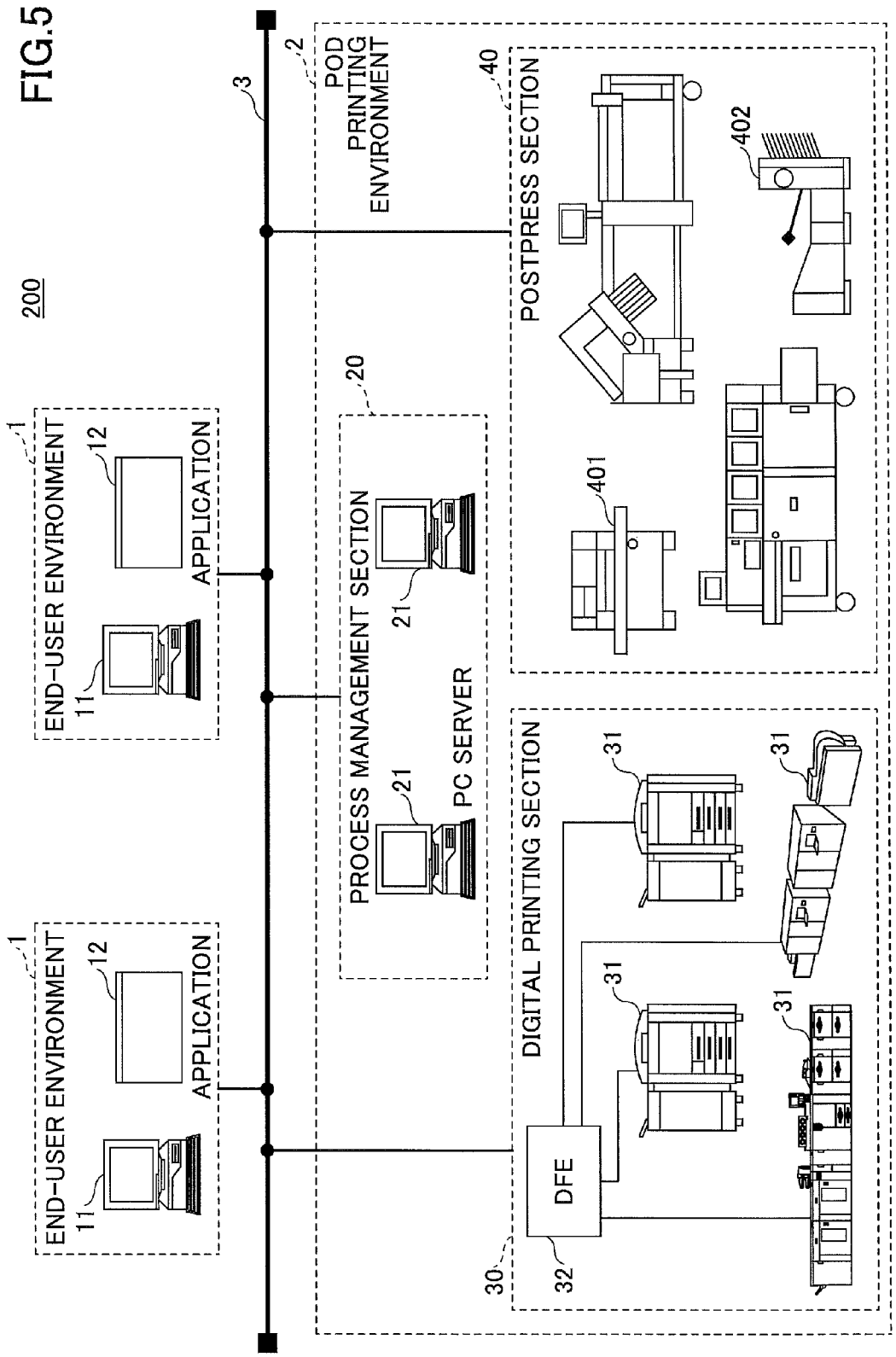
FIG. 5 is a schematic diagram illustrating an example of the whole structure of a print system.

FIG. 5 is a schematic diagram illustrating an example of the whole structure of a print system 200 of the present embodiment. The print system of the present embodiment includes one or more end-user environments 1 and a POD (Print On Demand) printing environment 2, which are connected with each other through a network 3 such as a LAN or the Internet.

In the end-user environment 1, a client PC 11 is disposed. A workflow application (hereinafter simply referred to as an application) 12 for a POD printing operation is installed in the client PC 11, and the client PC 11 creates printing jobs accepting user operations.

The application 12 includes a function of aggregation printing imposition (number up imposing function) for imposing a plurality of logical page images on a surface of a printing sheet, and a function of image editing for adding header, footer, or page number. Also, the application 12 outputs instructions such as punching or stapling for print bookbinding. Such instructions or settings are described in the JDF. The JDF may be referred to as a job ticket, or a print instruction.

The POD printing environment 2 includes a process management section 20, a digital printing section 30 and a postpress section 40, which are connected with each other through the network 3. In the POD printing environment 2, the process management section 20 instructs the digital printing section 30 and the postpress section 40 to operate, and consolidates the workflow of the POD printing environment 2.

The process management section 20 receives the printing jobs (JDF and PDL) from the end-user environment 1, and saves the printing jobs. Here, the JDF is an example of the setting information in the claims, while PDL is an example of the printing data in the claims. Although PDL is a language for specifying how to draw a page image (rasterized image), in the present specification the PDL means data described in the PDL. The PDL includes PDF (Portable Document Format), PostScript, PCL, RPDL, and the like.

Also, the process management section 20 assembles operations in the respective processes in a workflow, based on the printing jobs from the end-user environment 1, or schedules operations of the digital printing section 30, the postpress section 40, or the operators so as to be effectively performed. Further, the process management section 20 informs the operators of error occurrences, if needed. Generally, the process management section 20 is configured to include one or more PC servers 21.

The process management section 20 sends the printing jobs to the digital printing section 30 to let the digital printing section 30 print them. Further, printed documents are sent to the postpress section 40, and the postpress section 40 performs bookbinding, or the like, based on the instructions from the process management section 20. Additionally, the digital printing section 30 may directly send the printing jobs to the postpress section 40.

The digital printing section 30 is configured to include various printers 31 (printer devices such as printers for production printing, high speed color inkjet printers, and color/monochrome MFPs) 31. In the digital printing section 30, a DFE (Digital Front End) 32 is disposed. The DFE 32, also referred to as a print processing device, controls printing by the printers 31. As shown in FIG. 5, the DFE 32 may be separately disposed from the printers 31, or may be included in the printers 31. When receiving the printing job from the process management section 20, the DFE 32 generates raster data (an example of drawing data in the claims), using the JDF and the PDL, and sends it to the printer 31 for the printer 31 to form an image by toner or ink.

The digital printing section 30 includes various printers 31. Additionally, the digital printing section 30 may include a printer 31 directly connected with a finisher (post processing device) which performs post processes such as sheet folding, saddle stitching, binding a book by enfolding inner sheets with a cover sheet, and punching on the printed papers.

The postpress section 40 is configured to include, according to instructions for the printed documents (postpress jobs) operations from the process management section 20, post processing devices such as a sheet folder, a saddle stitching binder, an enfolding binder, a sheet cutter, a sheet enclosing machine, or a sheet mounting machine. Further, the postpress section 40 performs finishing processes such as sheet folding, saddle stitching, binding a book by enfolding inner sheets with a cover sheet, cutting, enclosing, or mounting on the printed papers output from the digital printing section 30. The postpress section 40 includes post processing devices for performing work after digital printing (post process), such as a stapler 401 and a puncher 402.

An end-user of the end-user environment 1 edits, imposes, inserts text, or instructs performing the post process by using the application 12 for POD printing operations installed in the client PC 11, and sends the printing jobs to the process management section 20 of the POD printing environment 2.

The PC server 21 of the process management section 20, according to the JDF, instructs the digital printing section 30 to print, and instructs the postpress section 40 to perform post processes.

[Hardware Configuration]

In the present embodiment, the printing jobs created by the end-user environment 1 are received by the process management section 20, and the process management section 20 sends the printing jobs to the DFE 32. The functions of the DFE 32 may be performed by a device in the network instead of the DFE 32. In the present embodiment, the DFE 32 performs work on the sheet surface according to the difference of the "RIP control Mode"s.

Figure 6:
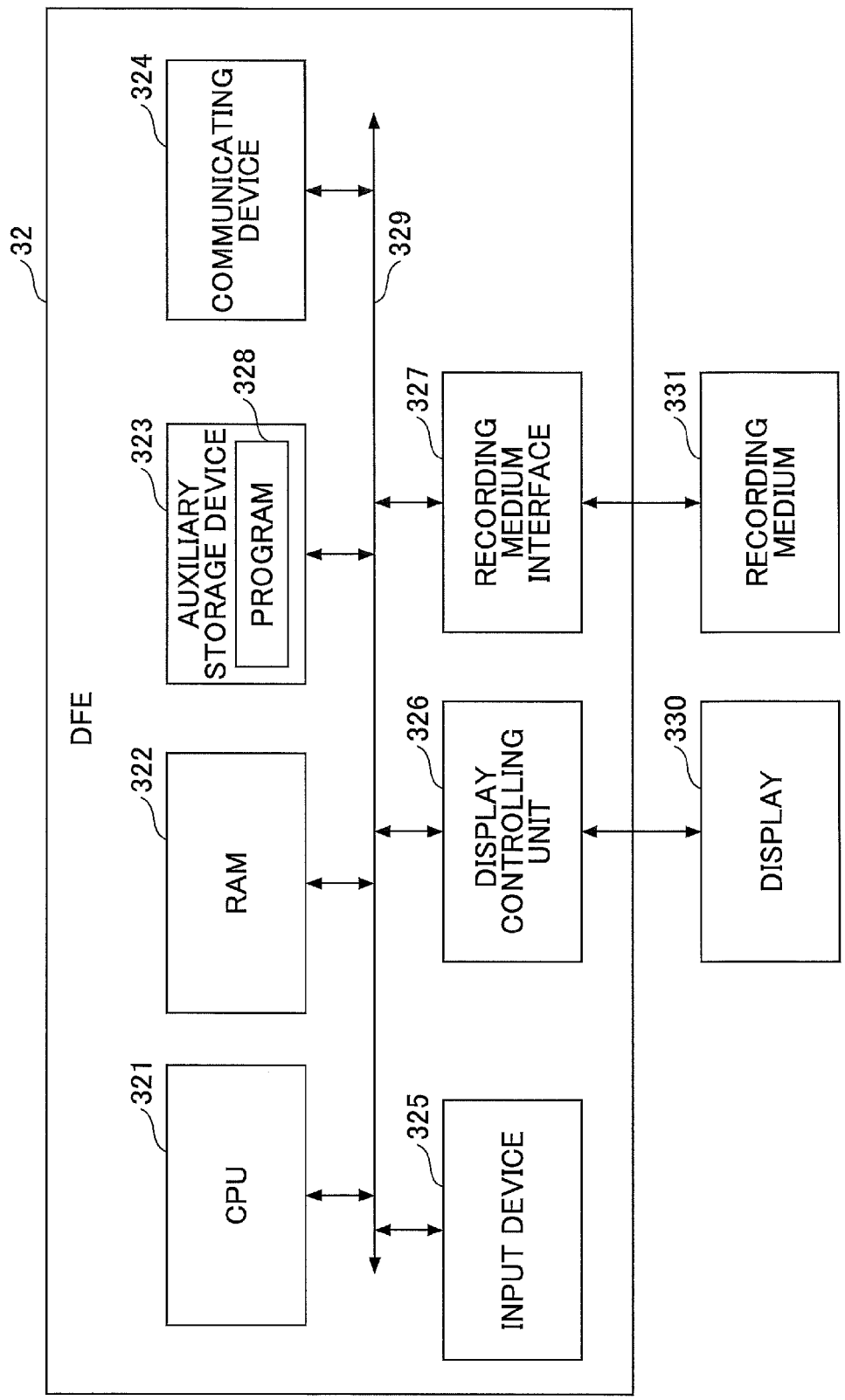
FIG. 6 is a block diagram illustrating an example of a hardware configuration of DFE.

FIG. 6 is a block diagram illustrating an example of a hardware configuration of the DFE 32. For example, the DFE 32 has the hardware configuration shown in FIG. 6. That is, the DFE 32 includes a function to serve as an information processing device (computer). DFE 32 includes a CPU 321, a RAM 322, an auxiliary storage device 323, a communicating device 324, an input device 325, a display controlling unit 326 and a recording medium interface 327, which are connected with each other through a bus 329.

The CPU 321 controls the entire DFE 32 by executing programs using the RAM 322 as a work memory. The auxiliary storage device 323 is a nonvolatile memory such as a HDD (Hard Disk Drive), or an SDD (Solid State Drive). The auxiliary storage device 323 stores a program 328 capable of converting the printing job.

The communicating device 324 is a modem, a LAN card, or the like, to communicate with the end-user environment 1, the process management section 20, or the postpress section 40, by connecting to the network 3. Also, the communicating device 324 communicates with the printer 31. The input device 325 is a keyboard, a mouse, or the like, accepting the user's operations. The display control device 326, connected with a display 330, displays screens on the display 330 under control of the CPU 321. Additionally, the display 330 may include a touch screen.

The recording medium interface 327 writes data on a recording medium 331, and reads data from the recording medium 331 under control of the CPU 321, where a portable recording medium is detachably attached to the recording medium interface 327. The recording medium 331 is an optical, an electrical, or a magnetic recording medium, such as a CD-ROM, an optical disk, a USB memory or an SD card; or another semiconductor memory, which records data electrically, such as flash memory. Various types of memory can be used as the recording medium 331.

Additionally, the program 328 is distributed while stored in the recording medium 331, or distributed by being downloaded from a server (not shown) through the network 3.

Also, the client PC 11 in the end-user environment 1 and the PC server 21 in the process management section 20 respectively have hardware configurations similar to that of FIG. 6.

[Function of DFE]

Figure 7:
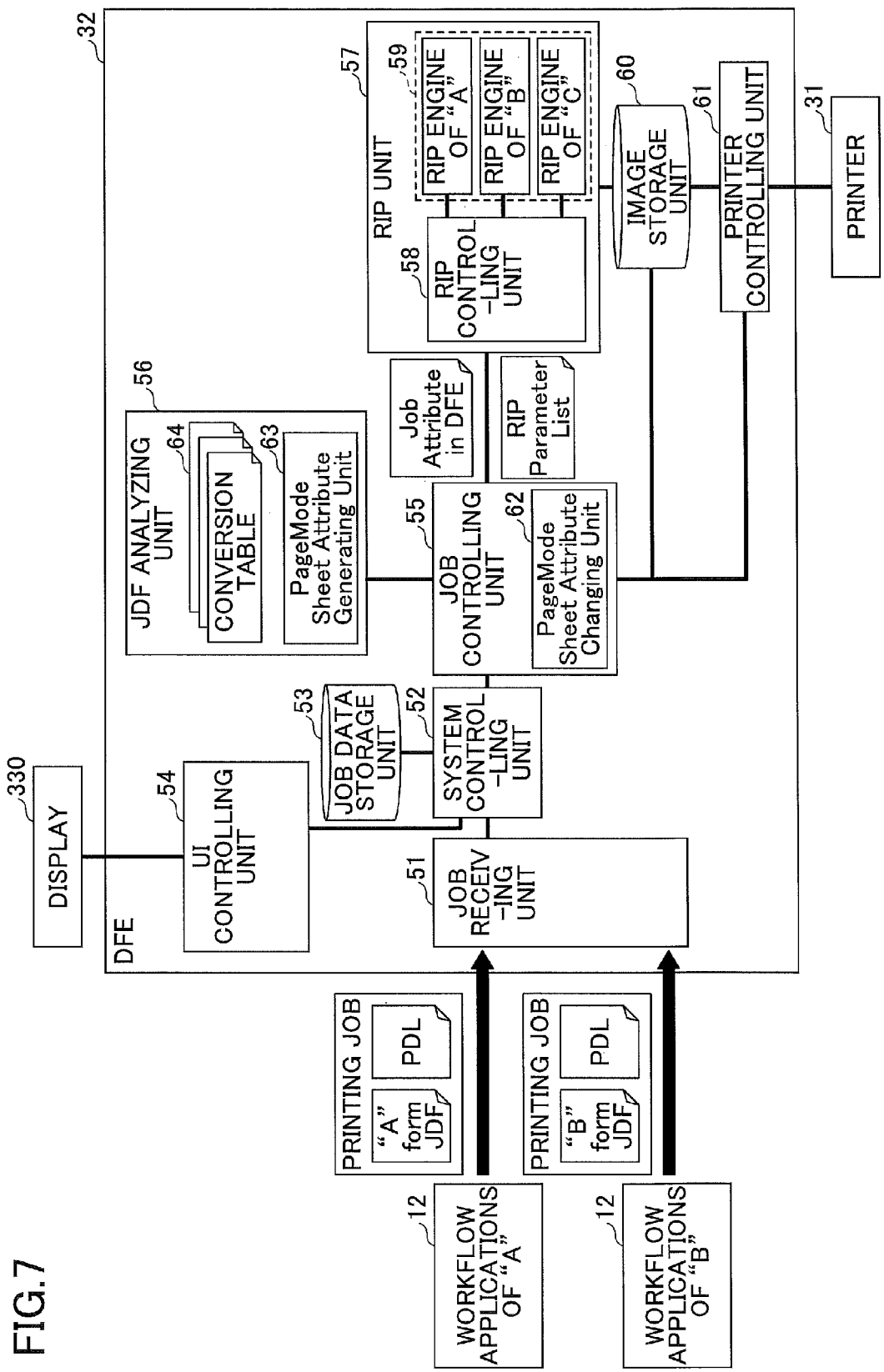
FIG. 7 is a block diagram illustrating a functional configuration of the DFE.

FIG. 7 is a block diagram illustrating an example of a functional configuration of the DFE 32. The DFE 32 performs job controlling, RIP controlling, or printer controlling, in a print workflow. Thus, the DFE 32 serves as a server that provides the end-user environment 1 and the process management section 20 with important functions of printing. Additionally, the job controlling means a control of a series of printing job processes, such as accepting the printing job, analyzing the JDF, creating raster data, printing by the printers 31, and the like. The RIP controlling means control of the RIP engines 59 to create the raster data by creating a "RIP Parameter List" after creating "Job Attributes in DFE" described later. RIP stands for "Raster Image Processor", and means a specific IC for creating the raster data, or a creation of the raster data itself. The printer controlling means a control of the printers 31 to print by sending the printers 31 the raster data and a part of the "Job Attributes in DFE" ("Finishing Information" described later).

The DFE 32 includes a job receiving unit 51, a system controlling unit 52, a UI controlling unit 54, a job controlling unit 55, a JDF analyzing unit 56, a RIP unit 57, a RIP controlling unit 58, RIP engines 59, and a printer controlling unit 61. Functions of these units are achieved by executing the program 328 by the CPU 321 in cooperation with various hardware resources which include hardware shown in FIG. 6. Further, the DFE 32 includes a job data storage unit 53 and an image storage unit 60, which are included in the configurations of auxiliary storage device 323, the RAM 322, the recording medium 331, or the like.

The job receiving unit 51 receives the printing jobs from the application 12, or the like, through the network 3. The job receiving unit 51 records, for example, unique job numbers, received dates, finished dates, statuses, etc., as log information respectively associated with the printing jobs. The printing jobs may be input from a USB memory, etc., instead of input from the application 12. Although the JDF is included in the printing job of the present embodiment, in a case where the JDF is not included in the printing job, the job receiving unit 51 creates a dummy JDF to enable the rendering.

The system controlling unit 52 stores the received printing jobs in the job data storage unit 53, or outputs them to the job controlling unit 55. For example, in a case where the JDF 32 is set, in advance, to store the printing jobs in the job data storage unit 53, the system controlling unit 52 stores the printing jobs in the job data storage unit 53. Also, for example, in a case where a description on whether storing the job in the job data storage unit 53 is included in the JDF, the DFE 32 follows the description.

In a case where a user operation for displaying contents of the printing jobs stored in the job data storage unit 53 on the display 330 is given, the system controlling unit 52 outputs the JDF of the printing jobs stored in the job data storage unit 53 to the UI controlling unit 54. In a case where the user changes the JDF, the UI controlling unit 54 accepts the change, and the system controlling unit 52 stores the changed JDF in the job data storage unit 53 again.

When receiving the instructions to execute the printing jobs from the user, the end-user environment 1, or the process management section 20, the system controlling unit 52 outputs the printing jobs stored in the job data storage unit 53 to the job controlling unit 55. Also, for example, in a case where a time to print is described in the JDF, the system controlling unit 52 outputs the printing jobs stored in the job data storage unit 53 to the job controlling unit 55, at the described time.

The job data storage unit 53 is a memory area for storing the printing jobs as described above, being included in the auxiliary storage device 323 or the recording medium 331. Further, the job data storage unit 53 may be included in a storage device on the network (not shown).

The UI controlling unit 54 displays the content of the printing job on the display 330, by analyzing the JDF. Further, the UI controlling unit 54 displays the raster data, created by the RIP engines 59, on the display 330.

The job controlling unit 55 controls the RIP controlling unit 58 to create the raster data, and controls the printer controlling unit 61 to print. Specifically, the job controlling unit 55 first sends the JDF of the printing job to the JDF analyzing unit 56, while outputting a JDF conversion request to the JDF analyzing unit 56.

The JDF analyzing unit 56 receives the JDF and the JDF conversion request from the job controlling unit 55. Then, the JDF analyzing unit 56 analyzes the description of the JDF to determine the manufacturer of the application 12 which has created the JDF. To determine the manufacturer of the application 12 which has created the JDF is equivalent to determining the RIP engine 59 which is expected to perform rendering of the printing job.

The JDF analyzing unit 56 converts the JDF into the "Job Attribute in DFE" which can be handled by the DFE 32, by using a conversion table 64 prepared for the respective manufacturers of the application 12. That is, in a case where the DFE 32 is created by the manufacturer "C", the JDF created by the application of not only manufacturer "C" but also manufactures "A" or "B" is converted into the "Job Attribute in DFE" which can be handled by the DFE 32 of "C". The "Job Attribute in DFE" is an example of the setting information for processing in the claims.

Additionally, in a case where none of the RIP engines 59 is determined as the one expected, by the application 12 having created the printing job, to render, the JDF analyzing unit 56 creates the "Job Attribute in DFE"s respectively based on the conversion table 64 for "A", the conversion table 64 for "B", and the conversion table 64 for "C". And the values of the attributes in the JDF are compared with values of items in the respective "Job Attribute in DFE"s to give evaluation values which becomes higher when there are fewer variances in the comparison result. A RIP engine 59 having high evaluation value is selected as an appropriate RIP engine 59.

When creating the "Job Attribute in JDF", the JDF analyzing unit 56 sets a "RIP Control Mode" in the "Job Attribute in JDF". It is researched in advance to know that with "Page Mode" or "Sheet Mode", the respective manufacturer creates the printing job. Therefore, if the manufacturer of the application 12 having created the JDF is determined, the "RIP Control Mode" can be determined too. In the present embodiment, the DFE 32 expects to use the "Page Mode" in aggregation print setting ("Page Mode" is the default mode of operation).

Also the JDF analyzing unit 56 includes a PageMode Sheet Attribute generating unit 63. The PageMode Sheet Attribute generating unit 63 analyzes the JDF to determine if aggregation print and sheet attribute are set for the RIP engine 59 which is operated in the "Page Mode". When the JDF, in which the aggregation print and the sheet attribute are set, is created for the RIP engine operated in the "Page Mode", the following process is performed. Additionally, the sheet attribute means setting work on the entire sheet surface (such as stamp, header, footer, or background pattern).

The PageMode Sheet Attribute generating unit 63 generates "Job Attribute in DFE"s for "Sheet" and for "Page", in a case where the aggregation print and sheet attribute are set in the JDF for the RIP engine operated in the "Page Mode". Thus, performing work on the sheet surface in the "Sheet Mode" can be done after performing page aggregation in the "Page Mode". The "Job Attribute in DFE"s for "Sheet" and for "Page" will be described later with reference to FIG. 13.

Also, the PageMode Sheet Attribute generating unit 63 adds an item of "Job Attribute in DFE Related Information" in the "Job Attribute in DFE" for "Sheet", and describes here unique information for indicating the "Job Attribute in DFE" for "Page" related to the "Job Attribute in DFE" for "Sheet". That is, the "Job Attribute in DFE" for "Page" and the "Job Attribute in DFE" for "Sheet" are associated with each other by the "Job Attribute in DFE Related Information".

Thus, the job controlling unit 55, having received the "Job Attribute in DFE", converts the "Job Attribute in DFE" and the PDL into "RIP Parameter List", thereby outputting the printing job as the "RIP Parameter List" to the RIP controlling unit 58. In the present embodiment, the job controlling unit 55 outputs the printing jobs to the RIP controlling unit 58 on the printing job basis. The "RIP Parameter List" is an example of the control data in the claims.

In a case where the "Job Attribute in DFE"s for "Sheet" and for "Page" are generated, the "RIP Parameter List"s for "Page" and for "Sheet" are generated too.

The job controlling unit 55 includes a PageMode Sheet Attribute changing unit 62. The PageMode Sheet Attribute changing unit 62 generates the "RIP Parameter List" according to the "Job Attribute in DFE Related Information", in a case where plural of the "Job Attribute in DFE" s are associated with each other with reference to the "Job Attribute in DFE Related Information" in the "Job Attribute in DFE". That is, an image output destination (an example of the output destination of the drawing data in the claims) of the "RIP Parameter List" for "Page" is changed into an image input source (an example of the input source of the drawing data in the claims) of the "RIP Parameter List" for "Sheet". Specific description will be given later.

In addition, the "RIP Parameter List" is a group of information for performing RIP process. The job controlling unit 55 determines commands of RIP process to be provided to the RIP engine 59 based on information included in the "RIP Parameter List". The commands are referred to as RIP commands. The "RIP Parameter List" includes a "RIP control mode". The RIP controlling unit 58 controls the RIP engines 59 with reference to the "RIP control mode". Therefore, a sequence is determined based on the "RIP control mode".

The RIP unit 57 includes the RIP controlling unit 58 and the RIP engines 59, and creates the raster data by using these units. The RIP controlling unit 58 analyzes information in the "RIP Parameter List" thereby determining the RIP engine 59 to be used. The RIP engine 59 is determined based on one or more items in the "RIP Parameter List" or based on identification information indicated on the "RIP Parameter List". For example, when the job controlling unit 55 indicates RIP engine identification information in the "RIP Parameter List", the RIP engine 59 identified by the RIP engine identification information is selected. The RIP controlling unit 58 sends RIP commands to the selected RIP engine 59 with reference to the "RIP Parameter List".

The RIP controlling unit 58, with reference to the "RIP Parameter List", in a case where the "RIP control Mode" is the "Sheet Mode", outputs RIP commands according to the "Sheet Mode". Thus, the differences in the printing jobs (mainly PDL) are absorbed.

The RIP engines 59 are rendering engines for creating the raster data by rasterizing according to the RIP commands. The RIP engine 59 is an example of the drawing data creating unit in the claims. The RIP engines 59 may be configured by software or hardware such as LSI. When configured by software, the respective RIP engines 59 perform rendering in parallel by multitasking, while when configured by hardware the respective RIP engines 59 perform rendering in parallel since the respective RIP engines 59 can be operated independently. Additionally, the RIP engines 59 may be realized by software and hardware.

The image storage unit 60 is a storage means for storing the created raster data. For example, the image storage unit 60 is included in the auxiliary storage device 323. Also, the image storage unit 60 may be included in a storage device in the network.

The printer controlling unit 61, being connected with the printer 31, retrieves the raster data stored in the image storage unit 60, and sends it to the printer 31, and thereby performs printing. Also, the finishing processes are performed based on the "Finishing Information" received from the job controlling unit 55.

The printer controlling unit 61 can obtain printer information by communicating with the printer 31 using various communication standards. For example, in CIP4 which creates standards for printing workflow defines a standard of DevCaps, as a JDF standard, for transferring device specific information to printers. Also, a method for gathering printer information, by using a communication protocol of SNMP (Simple Network Management Protocol) and a database of MIB (Management Information Base), is known. By using these, the printer controlling unit 61 obtains various information stored in the printer 31.

[JDF and Determination of Manufacturer of Application Having Created JDF]

The JDF is described in XML (Extensible Markup Language). The XML is a standard of structured text for structuring a document using tags which have specific meanings.

FIGS. 8A, 8B, and 8C are illustration diagrams respectively illustrating examples of a part of the description in the JDF. FIG. 8A shows an example of a part of the JDF created by the application 12 of "C". Instructions on the printing job are described in the JDF.

"JDF xmlns="http://www.CIP4.org/JDFSchema_1_1"" indicates that the JDF ticket is in compliance with CIP4.

"xmlns:C="www.ccc.com/schema/ccc"" indicates tag definition not in compliance with CIP4, that has been independently extended by a print business operator/Vender. In this example, tags starting with "C:" are all extended tags.

"ResourcePool" indicates a definition of a group of the attributes to perform printing.

"LayoutPreparationParams" is one of the attributes defined by the "ResourcePool", defining attributes related to the imposition.

"ResourceLinkPool" indicates the definition of a group of references to attributes in the "ResourcePool", where the attributes are commonly used within a specific range in the job, such as a range between pages, in which different attributes are used, or the like.

"ComponentLink" is a definition of a reference in the "ResourceLinkPool", indicating reference to the attributes related to output subjects and information thereof.

"Amount" indicates number of print copies.

"Rotate" indicates a rotation angle of the image.

FIG. 8B shows an example of the JDF and an extension of "A". FIG. 8C shows an example of the JDF and an extension of "B". In FIG. 8B "xmlns:A="www.aaa.com/schema/aaa"" indicates that tags in the JDF starting with "A:" are all extended tags of "A". In FIG. 8C "xmlns:B="www.bbb.com/schema/bbb"" indicates that tags in the JDF starting with "B:" are all extended tags of "B".

Therefore, the JDF analyzing unit 56 can determine the manufacturer of the application 12 having created the JDF with reference to such description in the JDF. The JDF can be converted into the "Job Attribute in DFE" which can be handled by the DFE 32 of "C", using a conversion table 64 (described later), corresponding to the manufacturer of the application 12.

<Determination if the sheet attribute is included or not in the "Page Mode">

JDF including the sheet attribute in the "Page Mode" is described with reference to FIGS. 9A, 9B, 9C and 9D. FIG. 9A is an example of output result according to the sheet attribute of stamp. FIG. 9B is an example of JDF including the sheet attribute of stamp. FIG. 9C is an example of output result according to cell attribute of stamp. FIG. 9D is an example of JDF including the cell attribute of stamp. The sheet attribute indicates performing work with straddling pages on a sheet surface, while the cell attribute indicates performing work on respective surfaces of the pages to be aggregated. Therefore, the stamp according to the sheet attribute forms a 10 letter a straddling pages while the stamp according to the cell attribute forms the letters a on the respective pages.

As shown in FIGS. 9B and 9D, a tag "LayouPreparationParams" indicates information of "N-up (aggregation print)".

"MarkObject" in a tag "Layout" indicates information of stamp "α".

Here, in "ResourceLinkPool", association of processes for achieving a job requested by the user is indicated. In "ResourcePool", information on an actual process is described. Tag information in the "ResourceLinkPool" and in the "ResourcePool" are associated with each other by "<(name of an element)>" in the "ResourcePool" and "<(name of an element) Link>" in the "ResourceLinkPool". For example, "LayoutLink" and "Layout" are associated with each other.

Therefore, it is possible to determine, based on the following description, that the stamp is not of cell attribute but of sheet attribute.

In the "ResourceLinkPool", it is defined as follows.

A link to "Layout" including the stamp is defined as the "LayoutLink", and "LayoutPreparationParams" including the N-up is defined as "LayoutPrepareationParamsLink".

The PageMode Sheet Attribute generating unit 63 determines if the sheet attribute in the "Page Mode" is included or not, in such a manner described above.

[Creation of Job Attribute in DFE]

Figure 11A:
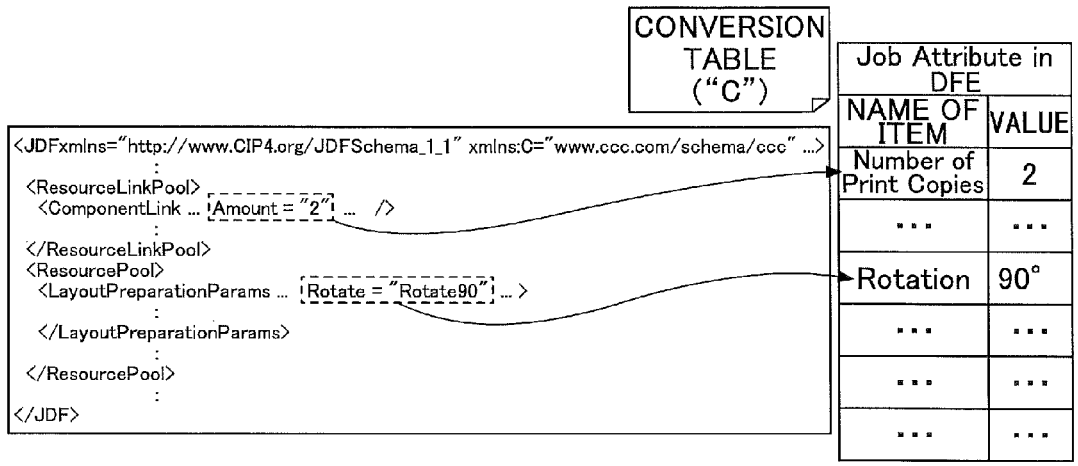
FIG. 11A is an illustration diagram for illustrating creation of the "Job Attribute in DFE"
Figure 11B:
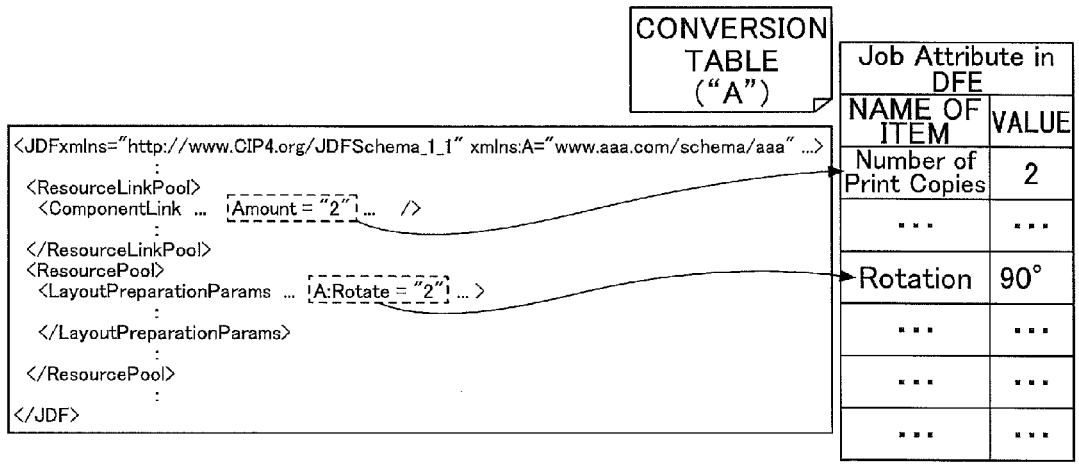
FIG. 11B is another illustration diagram for illustrating creation of the "Job Attribute in DFE"
Figure 11C:
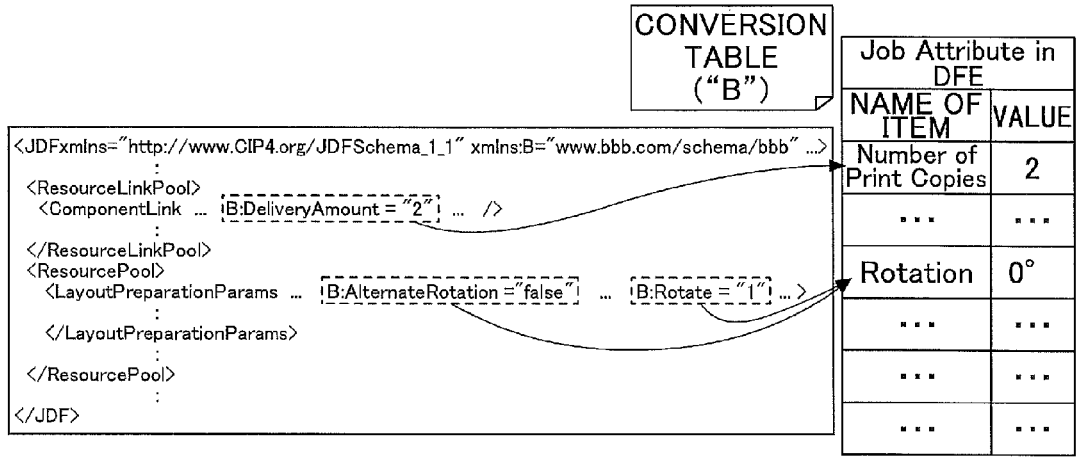
FIG. 11C is another illustration diagram for illustrating creation of the "Job Attribute in DFE"

In the following, creation of the "Job Attribute in DFE" will be described with reference to FIGS. 10A, 10B and 10C, and FIGS. 11A, 11B and 11C. FIGS. 10A, 10B, and 10C are illustration diagrams illustrating an example of a conversion table 64. FIGS. 11A, 11B and 11C are illustration diagrams for illustrating creation of the "Job Attribute in DFE". The JDF analyzing unit 56 converts the JDF, using the conversion table 64 corresponding to the manufacturer of the application 12 having created the JDF (RIP engine 59 expected to process the printing job), into the "Job Attribute in DFE". In a case where the manufacturer of the application 12 having created the JDF cannot be determined, JDF may be converted, by using every conversion table 64, into the "Job Attribute in DFE".

FIG. 10A is an illustration diagram illustrating an example of a conversion table 64 of "C". In the conversion table 64 of "C", a value of an attribute named "Amount" corresponds to a value of an item named "Number of Print Copies" while a value of an attribute named "Rotate" corresponds to a value of an item named "Rotation".

As shown in FIGS. 11A, 11B and 11C, the JDF is converted in a manner where the values of the attributes are used as the values of items in the "Job Attribute in DFE" with reference to the conversion table 64 for correlating the attributes of the tags in the JDF with the items in "Job Attribute in DFE".

The JDF analyzing unit 56 includes not only the conversion table 64 of "C" but also the conversion table 64 of "A" and the conversion table 64 of "B". FIG. 10B is an illustration diagram illustrating an example of a conversion table 64 of "A". FIG. 10C is an illustration diagram illustrating an example of the conversion table 64 of "B". As described above, the JDF analyzing unit 56 detects a description indicating the extended tags in the JDF to determine the manufacturer of the application 12, thereby selecting the conversion table corresponding to the manufacturer.

The JDFs of "A" and "B" can be also converted similarly. In the conversion table 64 of "A", a value of an attribute named "A:Amount" corresponds to a value of an item named "Number of Print Copies" while a value of an attribute named "A:Rotate" corresponds to a value of an item named "Rotation". In the conversion table 64 of "B", a value of an attribute named "B:DeliveryAmount" corresponds to a value of an item named "Number of Print Copies" while a value of an attribute named "Rotate" corresponds to a value of an item named "Rotation". Additionally, in the conversion table 64 of "B", operation of rotation is valid only in a case where a value of an attribute named "B:AlternateRotation" is "False". Therefore, when determined as the JDF of "A" or JDF of "B" by the JDF analyzing unit 56, the "Job Attribute in DFE" can be created similarly to the case of the JDF of "C".

Additionally, when the JDF analyzing unit 56 determines that a format related to aggregation print in the printing job is described by an application 12 of a manufacturer other than own manufacture (manufacturer "C"), the JDF analyzing unit 56 sets the "Sheet Mode" at an item named "RIP Control Mode" in the "Job Attribute in DFE". When the application 12 is own ("C") application, or a format related to aggregation print in the printing job is described in the same manner as described by the own application 12, the "Page Mode" is set at the item named "RIP Control Mode". Therefore, the RIP controlling unit 58 can control the RIP commands to output to the RIP engines 59, with reference to the "RIP Control Mode".

FIG. 12 is an illustration diagram illustrating an example of a "Job Attribute in DFE". The "Job Attribute in DFE" is broadly divided into "Job Information", which is related to execution of the job; "Edit Information", which is related to the raster data; and "Finishing Information", which is related to finishing processes.

An item of "Number of Print Copies" in the "Job Information" indicates the number of print copies.

An item of "Number of Pages" in the "Job Information" indicates the number of pages.

An item of "RIP Control Mode" in the "Job Information" indicates the "RIP Control Mode".

An item of "Job Attribute in DFE Related Information" in the "Job Information" indicates information for associating plural of the "Job Attribute in DFE"s with each other. For example, information for uniquely associating the "Job Attribute in DFE" for "Sheet" with the "Job Attribute in DFE" for "Page" is described.

The "Edit Information" includes an item of "Direction Information" for indicating print direction.

An item of "Print Side Information" in the "Edit Information" indicates print side of the sheet. An item of "Rotation" in the "Edit Information" indicates a rotation angle of a page.

An item of "Expansion/Reduction" in the "Edit Information" indicates expansion/reduction and rates thereof.

An item of "Position of Image: Offset" in the "Edit Information" indicates an offset of the image.

An item of "Position of Image: Position Adjusting Information" in the "Edit Information" indicates position adjusting of the image.

An item of "Layout Information: Custom•Imposition" in the "Edit Information" indicates custom imposition.

An item of "Layout Information: number of pages" in the "Edit Information" indicates the number of the pages in one sheet.

An item of "Layout Information: Imposition Information" in the "Edit Information" indicates information related to imposition.

An item of "Layout Information: Page Oder Information" in the "Edit Information" indicates Order in which the pages are printed.

An item of "Layout Information: Creep position Adjustment" in the "Edit Information" indicates information related to creep position adjustment.

An item of "Margin Information" in the "Edit Information" indicates information related to margin such as fitting box, or gutter.

An item of "Mark Information: Center•Crop•Mark Information" in the "Edit Information" indicates information related to center•crop•mark.

An item of "Mark Information: Corner•Crop•Mark Information" in the "Edit Information" indicates information related to corner•crop•mark.

An item of "Mark Information: Sheet Attribute" in the "Edit Information" indicates setting work on the sheet surface (such as stamp, header, footer, or background pattern).

An item of "Collate Information" in the "Finishing Information" indicates whether a document is printed on a page basis or on a document basis in a case where multiple copies of the document are printed.

An item of "Staple/Bind Information" in the "Finishing Information" indicates information related to staple/bind.

An item of "Punch Information" in the "Finishing Information" indicates information related to punching.

An item of "Folding Information" in the "Finishing Information" indicates information related to folding.

An item of "Trim" in the "Finishing Information" indicates information related to trimming.

An item of "Output Tray Information" in the "Finishing Information" indicates information related to an output tray.

An item of "Input Tray Information" in the "Finishing Information" indicates information related to an input tray.

An item of "Cover•Sheet Information" in the "Finishing Information" indicates information related to a cover•sheet.

Also, as described in FIG. 12, "RIP Control Mode" is set in the "Job Attribute in DFE". The "Page Mode" or the "Sheet Mode" is set in the "RIP Control Mode". Additionally, in the dummy JDF, the "Page Mode" is set in the "RIP Control Mode".

<"Job Attribute in DFE"s for "Sheet" and for "Page">
In the following, difference between the "Job Attribute in DFE" for "Sheet" and the "Job Attribute in DFE" for "Page" is described with reference to FIG. 13. FIG. 13 is an illustration diagram illustrating the difference between the "Job Attribute in DFE" for "Sheet" and the "Job Attribute in DFE" for "Page".

Since the "Job Attribute in DFE" for "Page" includes attributes for aggregation print, attributes of expansion/reduction (reduction for aggregation) and rotation are set in it. In FIG. 13, in order to aggregate pages 1-4 into one sheet in accordance with the shape of the sheet, each page is rotated 90° counter-clockwise. Also, each page is reduced so as to aggregate pages 1-4 into one sheet. Therefore, attributes of reduction (such as reduction rates) and rotation (such as rotation angle) are set in the "Job Attribute in DFE" for "Page".

Meanwhile, since attributes of reduction or rotation are not required, such attributes are not set in the "Job Attribute in DFE" for "Sheet". Also, with the respective pages being aggregated, attributes of image input source and the like are set in the "Job Attribute in DFE" for "Sheet". The image input source is information indicating four cells (images of the respective pages being reduced and rotated).

Further, information indicating the stamp, etc., is included in the "Sheet Attribute" in the "Edit Information" of the "Job Attribute in DFE" for "Sheet". Meanwhile, information indicating the stamp, etc., is not included in the "Sheet Attribute" in the "Edit Information" of the "Job Attribute in DFE" for "Page".

[RIP Parameter List]
FIG. 14 is an illustration diagram illustrating an example of the "RIP Parameter List".

"Input/Output Data Type Information" indicates types of input data and output data (input data and output data indicate not only the PDL but also text files or JPEG image data).

"Input/Output Data Read/Write position designation Information" indicates a method for designating the offset of input data and output data (read position/write position). For example, "from designated position", "from current position", "from tail end", etc., are indicated.

"Input/Output Data Read/Write position Information" indicates current processing position of input data and output data.

"Input/Output Data Read/Write Execution Mode Information" indicates modes of execution. For example, "READ", "WRITE", "READ WRITE", etc., are indicated.

"Measurement Unit Information (Dimension)" indicates measurement units used in the "RIP Parameter List". For example, "mm", "inch", "pel", "point", etc., are indicated.

"Input/Output Data Compression Method Information" indicates methods for compressing input data and output data. For example, "UNCOMPRESSED", "PACKBITS", etc., are indicated.

"RIP Control Mode" indicates control modes of the aggregation print. For example, "Page Mode" or "Sheet Mode" is indicated.

"Input/Output Image Information Part" includes "Information Related to Output Image", "Information Related to Input Image", and "Information Related to Operation of Image".

"Image Format•Type" indicates types of format of the output images. For example, "Raster", etc., are indicated.

"Image Format•Dimension" indicates dimensions of the output image format.

"Image Format•Resolution" indicates resolution of the output image format.

"Position of Image" indicates position of the output image.

"Color Separation Information" indicates color separation (color decomposition). For example, "k", "cymk", "separation", etc., are indicated.

"Color Plane•Fit•Policy Information" indicates methods for operating color planes.

"Plane Shift Information" indicates amount of shift of the color plane.

"Number of Bits in Image Format" indicates the number of bits in the output image format.

"Image Direction Information" indicates directions of the page of the output image.

"Image Formation Position Information" indicates position information of the crop•area.

"Image Formation Size Information" indicates size information of the crop•area.

"Image Formation Method Information" indicates policy of clip.

"Color ICC Information" indicates information related to color ICC profiles.

"Font Replacement Information" indicates information related to font replacement.

"Image Formation Basic Point Information" indicates basic points of the image formation. For example, "Center", "Top Right", etc., are indicated.

"Flat K Black Information" indicates information related to flat K black.

"Rendering Information" indicates information related to the rendering (rasterize).

"Image Format•Type" indicates types of format of the input image. For example, "Raster", etc., are indicated.

"Image Format•Dimension" indicates dimensions of the input image format.

"Image Format•Resolution" indicates resolution of the input image format.

"Position of Image" indicates positions of the input image.

"Input Data" indicates the input data.

"Page Range Information" indicates page numbers.

"Color ICC Information" indicates information related to color ICC profiles.

"Scaling•Offset Information" indicates offsets of expansion/reduction algorithm. For example, "Horizontal Offset", "Vertical Offset", etc., are indicated.

"Object•Area Information" indicates the width and the height of the object area.

"Halftone Information" indicates offsets of the halftone. For example, "Horizontal Offset", "Vertical Offset", etc., are indicated.

"Scaling Algorithm Information" indicates methods of scaling.

"Information Related to PDL" includes "Data Area", "Size Information", and "Data Arrangement Method".

The "Data Area" indicates information of the area storing the PDL. Font information, information of number of the pages, etc., are included in the PDL stored in the area.

The "Size Information" indicates the size of the PDL.

"Data Arrangement Method" indicates arrangement method of data. For example, "Little Endian", "Big Endian", etc., are indicated.

<"RIP Parameter List" for a case where the sheet attribute is set in the "Page Mode">

The PageMode Sheet Attribute changing unit 62 changes the image output destination of the "RIP Parameter List" for "Page" into the image input source of the "RIP Parameter List" for "Sheet". Since the "Job Attribute in DFE Related Information" is included in the "Job Attribute in DFE", the "RIP Parameter List", whose image output destination shall be changed, can be determined.

Positions of the respective pages with respect to the sheet are indicated as the image output destination of the "RIP Parameter List". In the present embodiment, since the "RIP Parameter List" for "Page" is image-processed page by page, the image output destination of the "RIP Parameter List" for "Page" is changed into the image input source of the "RIP Parameter List" for "Sheet" so that an image in which the respective pages aggregated can be in the "RIP Parameter List" for "Sheet".

Specifically, the following attributes of the "RIP Parameter List" for "Page" are changed.

"Input/Output Data Type Information"

"Input/Output Data Read/Write position designation Information"

"Input/Output Data Read/Write position Information"

"Input/Output Data Read/Write Execution Mode Information".

Figure 15A:
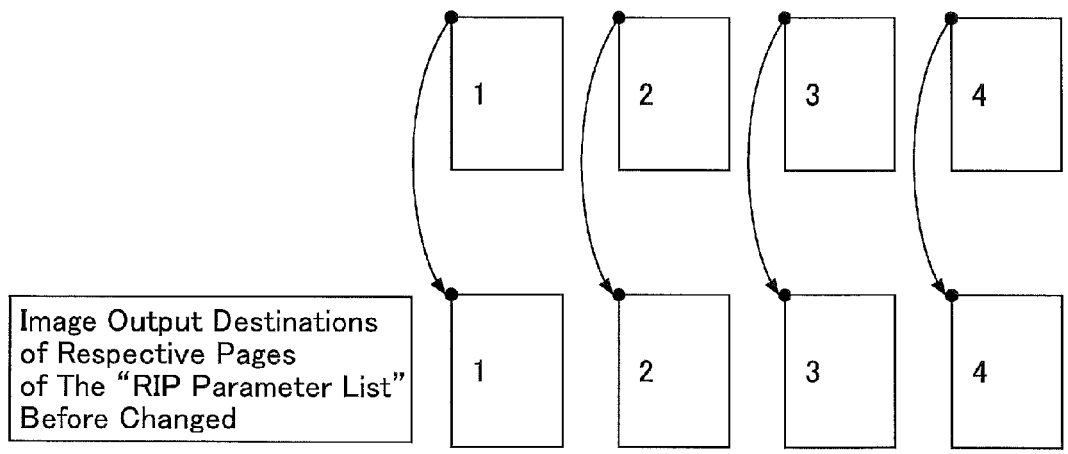
FIG. 15A is an illustration diagram showing frame formats of the image output destinations of the respective pages of the "RIP Parameter List" for "Page" before being changed.
Figure 15B:
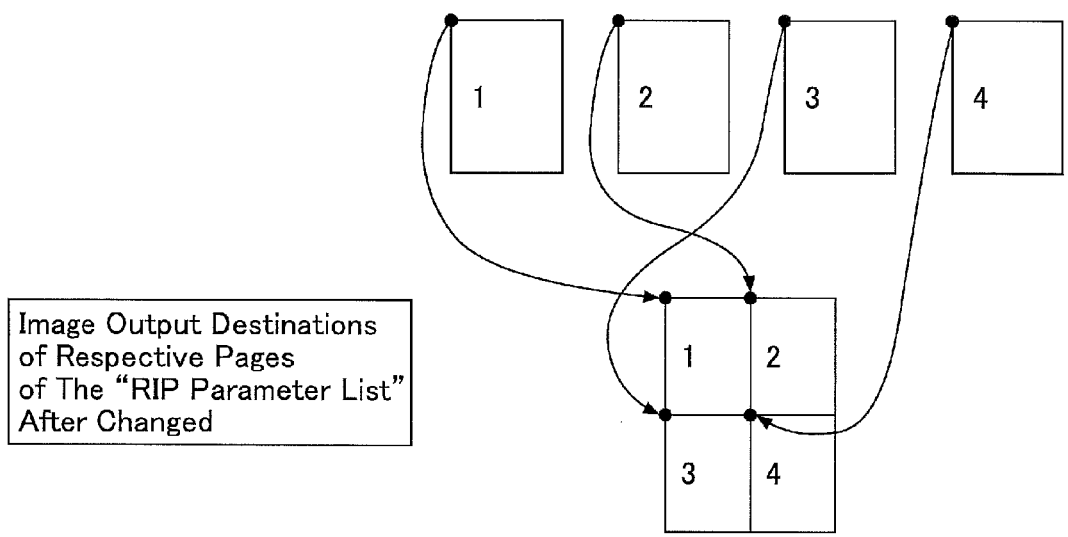
FIG. 15B is an illustration diagram showing frame formats of the image output destinations of the respective pages of the "RIP Parameter List" for "Page" after being changed.

FIGS. 15A and 15B are illustration diagrams illustrating an example of changing the image output destination in the "RIP Parameter List" for "Page". FIG. 15A is an illustration diagram showing the frame format of the image output destinations of the respective pages of the "RIP Parameter List" for "Page" before being changed. FIG. 15B is an illustration diagram showing frame format of the image output destinations of the respective pages of the "RIP Parameter List" for "Page" after being changed.

In FIG. 15A, the image output destinations of the respective pages are set so that the apexes of the respective pages correspond to the apexes of the respective sheets (margins are taken into account in actual use).

Meanwhile, in the present embodiment, since an image in which four pages are aggregated has been created with reference to the "RIP Parameter List" for "Page" and the image becomes the image input source of the "RIP Parameter List" for "Sheet", the apexes of the respective pages correspond to predetermined positions (determined in accordance with the number of aggregated pages or order of imposition).

Thus, the RIP controlling unit 58 can set the image in which four pages has been aggregated as the image input source of the "RIP Parameter List" for "Sheet", by changing the image output destination of the "RIP Parameter List" for "Page".

Additionally, for example, four BMPs (raw data) are set in the "Input/Output Data Type Information", and predetermined positions (for example, black dots in FIG. 15B) are set in the "Input/Output Data Read/Write position designation Information".

Although the "RIP Parameter List" for "Sheet" is not shown in the diagram, the image input source of the "RIP Parameter List" for "Sheet" has been set to the image in which the four pages are aggregated since the attributes are set in the "RIP Parameter List" for "Sheet" with the respective pages being aggregated. Therefore, the image output destination of the "RIP Parameter List" for "Page" shown in FIG. 15B becomes the image input source of the "RIP Parameter List" for "Sheet".

[Operation Flow]

Figure 16:
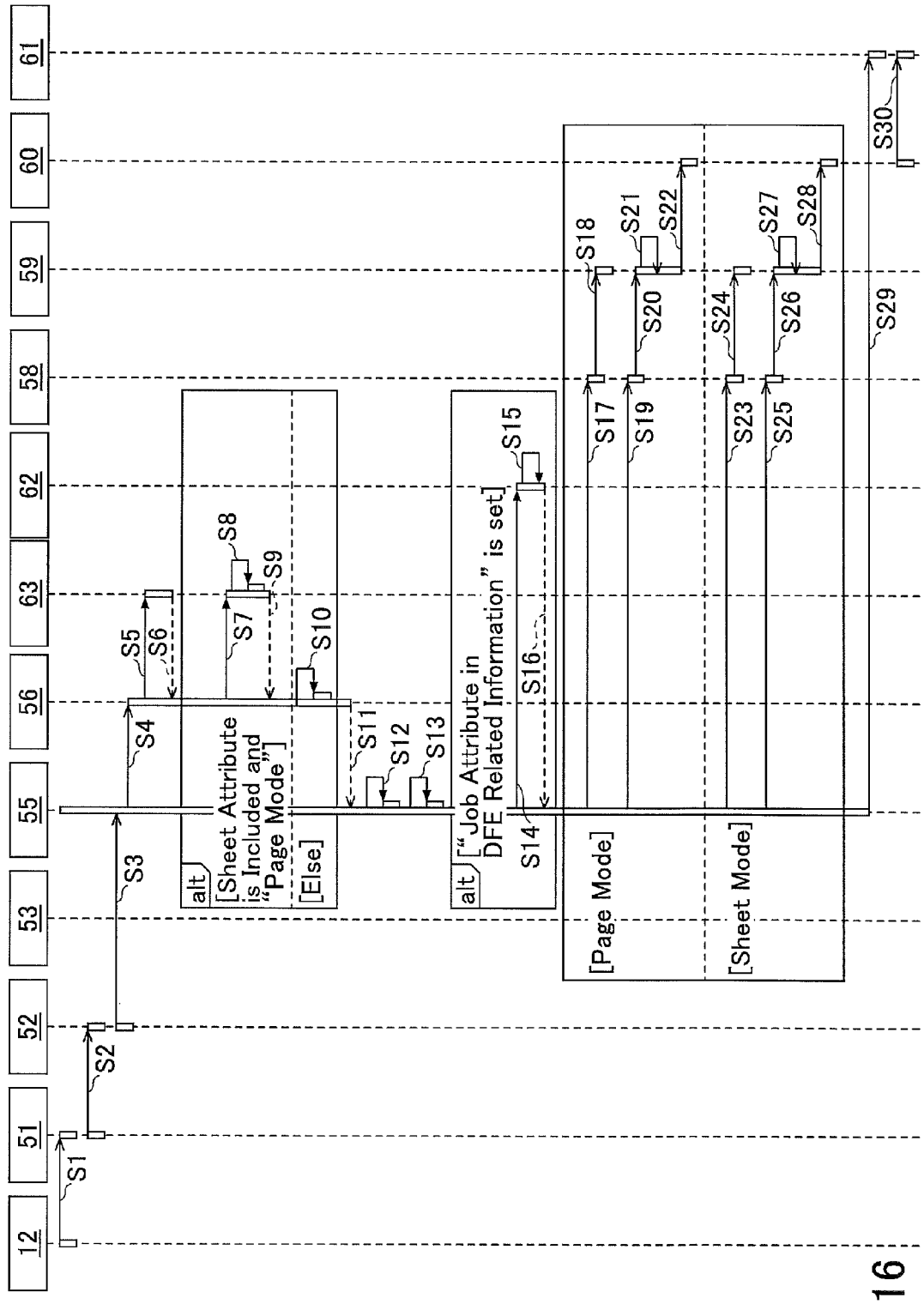
FIG. 16 is a sequence diagram illustrating the operation flow of a print system.

FIG. 16 is a sequence diagram illustrating the operation flow of the print system 200. In step S1, the application 12 sends the printing job (JDF+PDL) to the DFE 32.

In step S2, the job receiving unit 51 outputs the printing job (JDF+PDL) to the system controlling unit 52.

In step S3, the system controlling unit 52 outputs the printing job to the job controlling unit 55. Additionally, the system controlling unit 52 stores the printing job in the job data storage unit 53 in a case where the DFE 32 is set to store the printing job in the job data storage unit 53.

In step S4, the job controlling unit 55 outputs the JDF with a JDF conversion request to the JDF analyzing unit 56.

In step S5, the JDF analyzing unit 56 controls the PageMode Sheet Attribute generating unit 63 to determine if the sheet attribute is included or not.

In Step S6, the PageMode Sheet Attribute generating unit 63 outputs the determination result, indicating whether the sheet attribute is included or not, to the JDF analyzing unit 56.

Either steps S7-S9 or step S10 will be executed.

In step S7, in a case where the sheet attribute is included and "Page Mode" (with aggregation printing) is set in the "RIP Control Mode", the JDF analyzing unit 56 controls the PageMode Sheet Attribute generating unit 63 to generate the "Job Attribute in DFE" for "Page" and the "Job Attribute in DFE" for "Sheet".

In step S8, the PageMode Sheet Attribute generating unit 63 generates the "Job Attribute in DFE" for "Page" and the "Job Attribute in DFE" for "Sheet", and adds information that uniquely indicates the "Job Attribute in DFE" for "Page" in the "Job Attribute in DFE Related Information" of the "Job Attribute in DFE" for "Sheet". Additionally, the PageMode Sheet Attribute generating unit 63 analyzes the JDF to determine the manufacturer (RIP engine 59) of the application 12 having created the JDF, thereby creating the "Job Attribute in DFE" using the conversion table 64 corresponding to the determined RIP engine 59.

In step S9, the PageMode Sheet Attribute generating unit 63 outputs the "Job Attribute in DFE" for "Page" and the "Job Attribute in DFE" for "Sheet" to the JDF analyzing unit 56.

In step S10, in a case where the sheet attribute is not included (for example, the sheet attribute is not set while "Page Mode (with aggregation printing)" is set in the "RIP Control Mode"), the JDF analyzing unit 56 creates the "Job Attribute in DFE". Additionally, the JDF analyzing unit 56 analyzes the JDF to determine the manufacturer (RIP engine 59) of the application 12 having created the JDF, thereby creating the "Job Attribute in DFE" using the conversion table 64 corresponding to the determined RIP engine 59.

In step S11, the JDF analyzing unit 56 outputs the "Job Attribute in DFE" to the job controlling unit 55.

In step S12, the job controlling unit 55 creates the "RIP Parameter List" based on the "Job Attribute in DFE" and the PDL. In a case where the "Job Attribute in DFE" for "Page" and the "Job Attribute in DFE" for "Sheet" have been generated, two "RIP Parameter List"s are respectively created.

In step S13, the job controlling unit 55 determines if the "Job Attribute in DFE Related Information" is set in the "Job Attribute in DFE", or not.

In step S14, in a case where the "Job Attribute in DFE Related Information" is set in the "Job Attribute in DFE", the job controlling unit 55 lets the PageMode Sheet Attribute changing unit 62 change the "RIP Parameter List".

In step S15, the PageMode Sheet Attribute changing unit 62 changes the image output destination of the "RIP Parameter List" for "Page" into the image input source of the "RIP Parameter List" for "Sheet".

In step S16, the PageMode Sheet Attribute changing unit 62 outputs the "RIP Parameter List" for "Page" and the "RIP Parameter List" for "Sheet" to the job controlling unit 55.

After creating the "RIP Parameter List", the "RIP Parameter List" for "Page" and the "RIP Parameter List" for "Sheet" are output in series to the RIP controlling unit 58. When the sheet attribute is not included while "Page Mode (with aggregation printing)" is set in the "RIP Control Mode", either sequence of the "Page Mode" or sequence of "Sheet Mode" is selected to be executed, according to the "RIP Control Mode".

In step S17, first, the job controlling unit 55 outputs the "RIP Parameter List" for "Page" to the RIP controlling unit 58.

In step S18, the RIP controlling unit 58 initializes the RIP engines 59.

In step S19, the job controlling unit 55 requests the RIP controlling unit 58 to cause RIP execution.

In step S20, the RIP controlling unit 58 outputs the RIP commands instead of the job controlling unit 55. The RIP controlling unit 58 outputs the RIP commands in a sequence suitable for the "Page Mode" in a case where the "RIP Control Mode" is the "Page Mode".

In step S21, the RIP engine 59 rasterizes.

In step S22, the RIP engine 59 stores the raster data in the image storage unit 60. Thus, the raster data in which, for example, the four pages are aggregated is created.

Next, the job controlling unit 55 performs rendering in the "Sheet Mode".

In step S23, the job controlling unit 55 outputs the "RIP Parameter List" for "Sheet" to the RIP controlling unit 58.

In step S24, the RIP controlling unit 58 initializes the RIP engines 59.

In step S25, the job controlling unit 55 requests the RIP controlling unit 58 to perform RIP execution.

In step S26, the RIP controlling unit 58 outputs the RIP commands in a sequence suitable for the "Sheet Mode". Since the image input source is the respective aggregated cells (pages in a sheet), processes are performed on a cell basis.

In step S27, the RIP engine 59 rasterizes.

In step S28, the RIP engine 59 stores the raster data in the image storage unit 60.

In step S29, the job controlling unit 55 outputs the "Finishing Information" with a print execution request to the printer controlling unit 61.

In step S30, the printer controlling unit 61 retrieves the raster data from the image storage unit 60 to print.

As described above, in a case where the aggregation print and the sheet attribute are included in the JDF for the RIP engine 59 which is operated in the "Page Mode", the DFE 32 of the present embodiment performs rendering in the "Page Mode", then forms the stamp, in the "Sheet Mode". Therefore, the RIP engine 59 which is operated in the "Page Mode" can perform work with straddling pages on a sheet surface.

[Suitable Variations]

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

For example, although the DFE 32 has all the functions in FIG. 7, these functions may be distributed to separate devices which can communicate with each other through the network 3. For example, the RIP engines 59 and the JDF analyzing unit 56 may be disposed in the network which can be accessed by the DFE 32.

Similarly, the image storage unit 60 or the job data storage unit 53 may be disposed in the network which can be accessed by the DFE 32.

The present application is based on Japanese Priority Application No. 2014-047897 filed on Mar. 11, 2014, and Japanese Priority Application No. 2015-035473 filed on Feb. 25, 2015, the entire contents of which are hereby incorporated herein by reference.

What is claimed is:

1. An information processing apparatus for creating drawing data based on a printing job including printing data and setting information, comprising:
a Raster Image Processor (RIP) configured to create drawing data based on the printing job; and
a job controlling unit configured to create first control data and second control data, based on the printing data and the setting information, for controlling the RIP to create the drawing data, in response to detecting that a predetermined setting is included in the setting information,
wherein the job controlling unit outputs the first control data to the RIP to create first drawing data, and outputs the second control data to the RIP to create second drawing data in which the first drawing data is used.

2. The information processing apparatus as claimed in claim 1, further comprising:
a plurality of said RIPS; and
an analyzing unit configured to select, through an analysis of the printing job, a RIP from the RIPS to create a drawing datum based on the printing job,
wherein the job controlling unit creates the first control data and the second control data, in response to detecting that the predetermined setting is included in the setting information and the RIP determined by the analyzing unit is operated in a certain operation mode.

3. The information processing apparatus as claimed in claim 1, further comprising a page mode sheet attribute changing unit configured to change the first control data created by the job controlling unit so that an output destination of image data used in the first drawing data described in the first control data becomes an input source of image data used in the second drawing data described in the second control data.

4. The information processing apparatus as claimed in claim 3, further comprising a page mode sheet attribute generating unit configured to convert the setting information into the setting information for processing, wherein the job controlling unit creates the first control data and the second control data, using the setting information for processing, the page mode sheet attribute generating unit converts the setting information thereby creating first setting information for processing and second setting information for processing and adds association information for associating the second setting information for processing with the first setting information for processing in the second setting information for processing in response to detecting that the predetermined setting is included in the setting information, and
the page mode sheet attribute changing unit changes the first control data so that the output destination of the image data described in the first control data becomes the input source of the image data described in the second control data in response to detecting that the association information is included in the second setting information for processing.

5. The information processing apparatus as claimed in claim 4, wherein the predetermined setting indicates forming an image straddling pages aggregated into an image of the drawing data, the page mode sheet attribute generating unit creates the first setting information for processing which includes setting for aggregating the pages into the image of the drawing data and the second setting information for processing which includes setting for forming the image straddling the pages, in response to detecting that the predetermined setting is included in the setting information.

6. The information processing apparatus as claimed in claim 5, wherein the job controlling unit creates the first control data for aggregating the pages into the image of the drawing data using the printing data and the first setting information for processing, and the second control data for forming the image on the image of the drawing data of the first drawing data, using the printing data and the second setting information for processing; and
the page mode sheet attribute changing unit changes the first control data so that the output destination of the image data of the pages described in the first control data becomes the input source of the image data described in the second control data.

7. An information processing method for controlling a Raster Image Processor (RIP) to create drawing data based on a printing job including printing data and setting information, the method comprising the steps of:
creating first control data and second control data for controlling, by a job controlling unit, the RIP to create the drawing data based on the printing data and the setting information, in response to detecting that a predetermined setting is included in the setting information;
outputting the first control data from the job controlling unit to the RIP thereby creating first drawing data;
outputting the second control data from the job controlling unit to the RIP thereby creating second drawing data in which the first drawing data is used; and
generating a printed output at a printer based on the second drawing data.

8. A non-transitory computer-readable recording medium having stored therein a program for causing a computer to serve as an information processing apparatus for controlling a Raster Image Processor (RIP) to create drawing data based on a printing job including printing data and setting information, the information processing apparatus performing the steps of:
creating first control data and second control data for controlling the RIP to create the drawing data based on the printing data and the setting information, in response to detecting that a predetermined setting is included in the setting information;
outputting the first control data to the RIP thereby creating first drawing data;
outputting the second control data to the thereby creating second drawing data in which the first drawing data is used.

* * * * *